United States Patent [19]

Bala et al.

[11] 4,126,228
[45] Nov. 21, 1978

[54] BICYCLE RACK WITH LOCK

[76] Inventors: Lawrence G. Bala, 680 Gravinstien Hwy. N., Sebastopol, Calif.; Ernie G. Bala, 691 Parkview Cir., Pacifica, Calif. 94044

[21] Appl. No.: 310,923

[22] Filed: Nov. 30, 1972

[51] Int. Cl.$^2$ ............................................. B62H 3/08
[52] U.S. Cl. ........................................ 211/5; 70/234; 211/22
[58] Field of Search ...................... 211/4, 5, 17, 18, 19, 211/20, 21, 22, 23, 24; 70/233, 234, 235, 58, 62; 248/19 R, 21

[56] References Cited

U.S. PATENT DOCUMENTS

| 606,118 | 6/1898 | Bowman | 211/5 |
|---|---|---|---|
| 613,773 | 11/1898 | Neumann | 211/17 X |
| 639,517 | 12/1899 | Butcher | 211/5 |
| 2,803,349 | 8/1957 | Talbot | 211/22 |
| 2,951,588 | 9/1960 | O'Neil | 211/4 |
| 3,438,506 | 4/1969 | Groth | 211/4 |
| 3,739,609 | 6/1973 | Kaufmann | 211/5 X |

FOREIGN PATENT DOCUMENTS

| 66,833 | 5/1948 | Denmark | 211/20 |
|---|---|---|---|
| 67,663 | 9/1948 | Denmark | 211/5 |
| 21,824 | 5/1900 | Fed. Rep. of Germany | 211/20 |
| 59,307 | 4/1947 | Netherlands | 211/5 |

*Primary Examiner*—Richard E. Moore
*Attorney, Agent, or Firm*—Phillips, Moore, Weissenberger, Lempio & Majestic

[57] ABSTRACT

There is disclosed a bicycle rack with channel means to receive the wheels, and latching means including a plurality of arms to simultaneously latch the wheels in the channel, and the frame to the channel. An upstanding support arm is operative to support the bicycle in the upright position and to cooperate with the latching means to provide locking means for the rack.

11 Claims, 4 Drawing Figures

BICYCLE RACK WITH LOCK

BACKGROUND OF THE INVENTION

The present invention relates to bicycle racks and pertains more particularly to a combined bicycle rack and locking means.

Bicycles and motorcycles have become quite popular as a mode of transportation and a means of recreation. Because of this popularity and the ease of transportability of these vehicles, they have become a common target for thieves.

Many proposals have been made for locking these vehicles to prevent theft. These proposals, however, are generally ineffective. For example, if the wheels are locked to prevent riding the vehicle, the thief simply loads it in a truck and hauls it away. If the frame of the cycle is locked by means of a chain to a stationary object, the thief simply removes the wheels and leaves the frame if he cannot cut the chain. If he should find that a cycle is locked by a wheel to a stationary object, he simply takes the frame and remaining wheel. Thus, he simply takes individual wheels and frames, where available, and assembles them into complete units later.

Examples of the prior art approach to this problem are illustrated in the following patents:

U.S. Pat. No. 557,900 issued Apr. 7, 1896 to Shannon
U.S. Pat. No. 590,425 issued Sept. 21, 1897 to Smart
U.S. Pat. No. 597,507 issued Jan. 18, 1898 to McIntosh
U.S. Pat. No. 605,628 issued June 14, 1898 to Bradley
U.S. Pat. No. 636,629 issued Nov. 7, 1899 to Butcher
U.S. Pat. No. 698,277 issued Apr. 22, 1902 to Hammond

SUMMARY OF THE INVENTION

It is the primary object of the present invention to provide a bicycle support rack that includes means to effectively lock the major components of the bicycle to the rack.

Another object of the present invention is to provide a simple and inexpensive bicycle support rack that overcomes the above problems of the prior art.

In accordance with a primary aspect of the present invention there is provided a bicycle rack that includes channel means to receive the wheels of a bicycle with means to support the bicycle in a vertical position and lock it to the channel means.

BRIEF DESCRIPTION OF THE DRAWINGS

The above and other objects and advantages of the present invention will become apparent from the following description when read in conjunction with the accompanying drawings wherein.

DESCRIPTION OF THE PREFERRED EMBODIMENT

Figure 1:
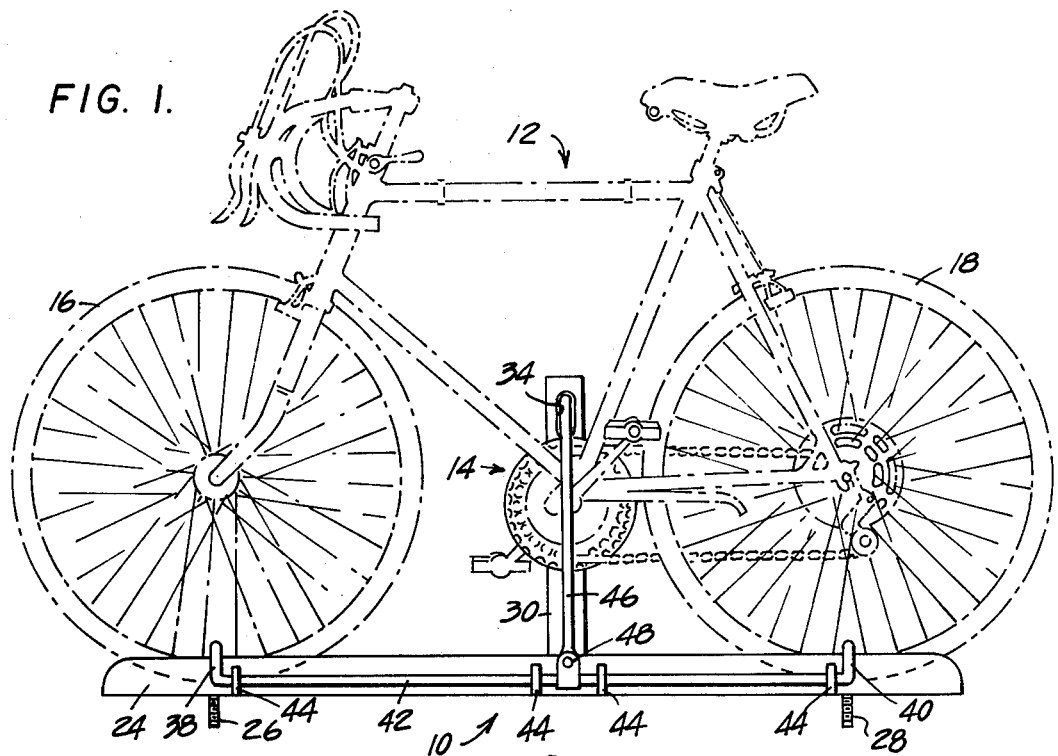
FIG. 1 is an elevational view of a bicycle rack in accordance with the present invention.

With reference now to the drawings there is illustrated in FIG. 1 an elevational view of a rack in accordance with the present invention generally designated by the numeral 10 and shown supporting a bicycle of generally conventional design designated by the numeral 12. Although the present invention is to be described with respect to a bicycle it is to be understood that the present rack may be adapted to use for motorcycles and the like. The bicycle 12 has the usual chassis defined by a tubular frame having a lower frame portion 14 wherein is journaled the main drive sprocket and pedals. Rotatably secured to the ends of the frame are the usual front wheel 16 and rear wheel 18.

The rack itself comprises a base member defined by a generally U-shaped channel member having a bottom 20, and sidewalls 22 and 24 respectively. The channel member opens upwardly and receives the wheels 16 and 18 of the bicycle as illustrated in FIG. 1.

The base or channel member may be secured directly to a concrete slab or the like for stationary mounting or may be secured to a vehicle for transporting bicycles and the like. Bolts 26 and 28 for securing the channel are disposed directly beneath the wheels 16 and 18 so that they may not be removed when the bicycle is locked into position therein.

Figure 3:
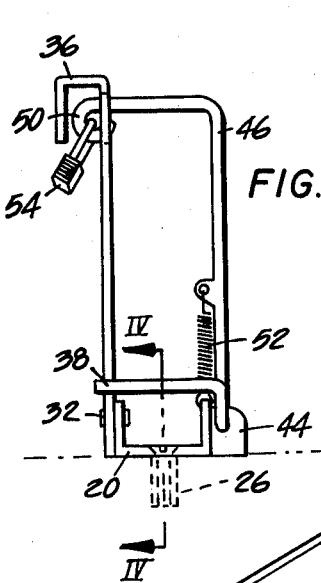
FIG. 3 is an end view of the rack of FIG. 2.
Figure 2:
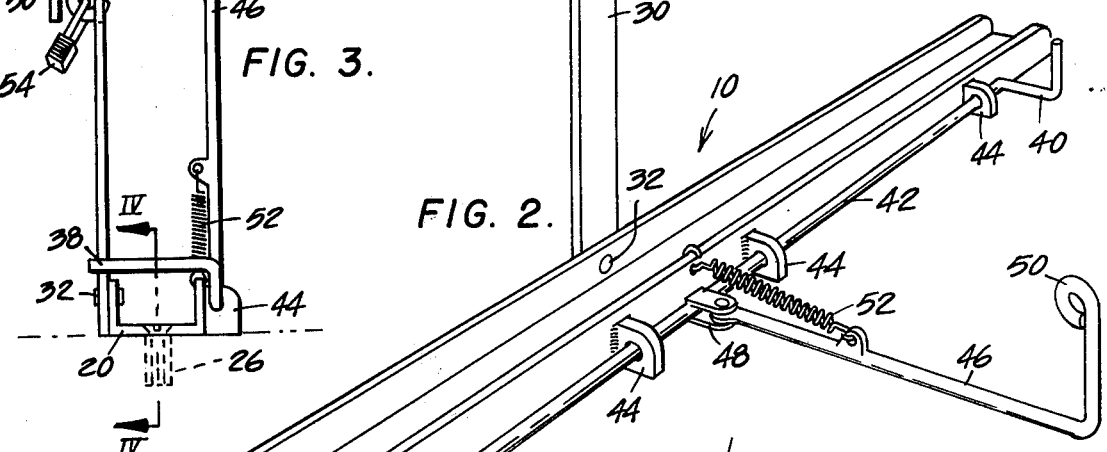
FIG. 2 is a perspective view of the rack of FIG. 1.
Figure 4:
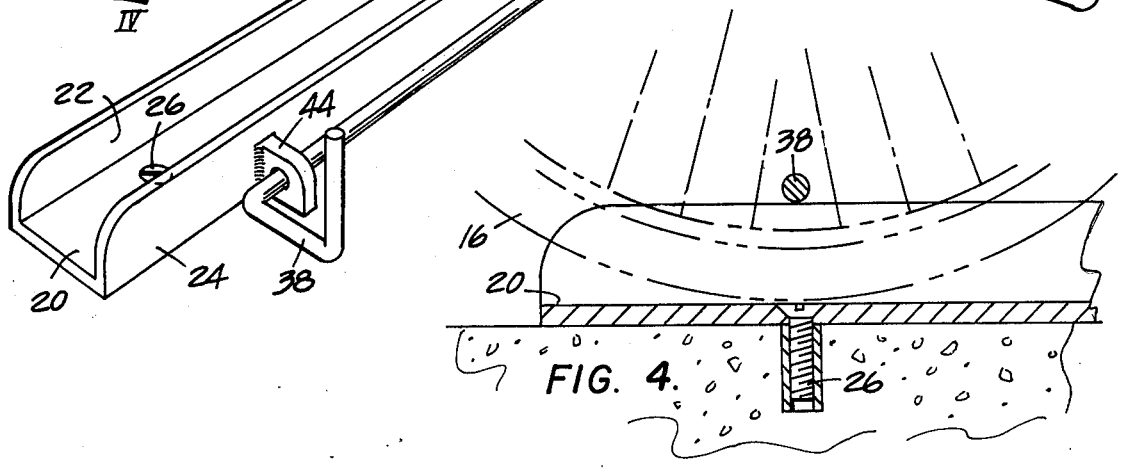
FIG. 4 is a partial section taken generally along lines IV—IV of FIG. 3.

A support arm 30 is secured in a suitable manner but preferably by pinning as by means of a rivet or the like 32 near the center of the base member and extends upward therefrom to engage and support the bicycle in the upright position as shown in FIG. 1. The support arm 30 is preferably pivoted to accommodate differences in position of the lower frame portion of different bicycles and also so that it may be folded down alongside the sidewall 22 to make it more compact for packaging or shipping. The support arm 30 also includes locking means in form of a slot 34 for receiving a lock portion to be described. A shield member 36 is formed as shown in FIGS. 2 and 3 to shield a padlock as shown best in FIG. 3. This lock shield is for the purpose of preventing the lock from being cut such as by means of bolt cutters or the like.

Suitable latching means for the bicycle comprises a pair of generally L-shaped arms 38 and 40 operatively interconnected by means of a shaft 42 rotatably mounted such as by means of a plurality of brackets 44 to the sidewall 24 of the channel member. A third L-shaped arm 46 is pivotally secured in a suitable manner such as by bracket and pin 48 to the rotatable shaft 42 near the center thereof. This pivotal connection permits the arm 46 to fold down along the channel as with arm 30 for ease in storing or packaging. The arm 46 includes a loop 50 formed on the outer end thereof and cooperatively with the slot 34 and support arm 30 to define locking means as shown in FIG. 3 for receiving a conventional padlock 52. The loop 50 extends through slot 34 as shown. Other suitable lock means may be provided.

Suitable spring means such as a tension spring 52 is operatively connected between sidewall 24 and arm 46 to pivot the latching means into the upright or latched position as best seen in FIGS. 1 and 3.

The rack and lock assembly is prepared to receive a bicycle by folding the latching means comprising the arms 38, 40 and 46 in a downward position as shown in FIG. 2. The bicycle is then placed with the wheels 16 and 18 within the channel between sidewalls 22 and 24 and leaned against the upright arm 30 to support it in the upright position. The latching means is then permitted to pivot upward so that the arms 38 and 40 extend across the open channel as shown in FIG. 3 and over the lower portion of the wheels 15 and 18 as seen in FIG. 1. At the same time, or simultaneously therewith, arm 46 extends through the frame over the lower portion 14 thereof and extends into slot 34 to a position as shown in FIG. 3 to receive a padlock 52. The bicycle is then supported and locked into a position in the rack as shown in FIG. 1. By this arrangement it is seen that the three major components of the bicycle are simultaneously locked into position by means of the respective locking means. Thus, the wheels 16 and 17 are locked by the arms 38 and 40 respectively and the frame is locked into position by means of arms 46 and 30 cooperating.

Thus, from the above description it is seen that we have provided a simple inexpensive bike rack and locking assembly that is operative to simultaneously lock the two wheels of the bicycle and the frame assembly into position in the rack.

While the present invention has been described with respect to a specific embodiment, it is to be understood that changes and modifications may be made therein without departing from the spirit and scope of the present invention as defined in the appended claims.

What is claimed is:

1. A combined support and lock assembly for bicycles, said assembly comprising:
   a base member including substantially U-shaped upwardly opening channel means to receive the wheels of a bicycle;
   support means extending upward from said base member for engaging the frame of said bicycle at one side thereof to hold same in an upright position;
   latch means comprising a plurality of interconnected arms pivoted to the other side of said channel from said support means and operative to extend across the open trough of said channel to simultaneously latch both wheels of said bicycle in said channel means;
   said latch means further including an arm for extending across a portion of said frame and cooperative with said support means for latching the frame of said bicycle to said base member simultaneously with latching said wheels in said channels; and
   lock means operatively connected for locking said latch means in said latched position.

2. The assembly of claim 1 wherein said arms are interconnected by means of an elongated shaft rotatably journaled in a plurality of brackets secured to one side of said channel.

3. The assembly of claim 1 comprising spring means for biasing said arms to said latched position.

4. A combined support and lock assembly for bicycles, said assembly comprising:
   a base member including substantially U-shaped upwardly opening channel means to receive the wheels of a bicycle;
   latch means comprising a plurality of L-shaped arms interconnected by an elongated shaft rotatably journaled to one side of said channel and operative to extend across the open trough of said channel to a latched position;
   lock means operatively connected for locking said latch means in said latched position; and
   support means comprising a support arm secured to the sidewall of said channel on the opposite side thereof from said elongated shaft for engaging the chassis of said bicycle to hold same in an upright position, and cooperates with one of said plurality of L-shaped arms to latch said frame of said bicycle to said base member.

5. The assembly of claim 4 wherein said one of said L-shaped arms includes a loop extending through a slot in said support arm to define lock means for receiving a padlock.

6. The assembly of claim 5 wherein said support arm includes a shield member to extend over a padlock engaging said loop to prevent access thereto by bolt cutters or the like.

7. The assembly of claim 4 wherein said support arm and said one of said L-shaped arms are pivotally mounted to be extendable along said channel.

8. The assembly of claim 4 comprising spring means biasing said L-shaped arms to said latched position.

9. Bicycle securing apparatus comprising a base, a first member extending from the base, a second member associated with the base so as to be movable towards and from said first member to define inward and outward positions relative thereto, with a portion of the second member being in close proximity to a portion of the first member when said inward position is defined, and said portion of the second member being removed from the portion of the first member when said outward position is defined, said first and second members being located to allow positioning of the bicycle body therebetween when said outward position is defined, said portion of the second member having a first element extending generally normal to the second member and engageable with said portion of the first member when said inward position is defined and adapted to be releasably locked to said first member in such engaged position, said first element being positioned to pass through the frame of a bicycle body disposed between said members and be continuously surrounded by such frame, and said second member further having a pair of second elements disposed on opposite sides of said first element and movable with said second member, said second elements being engageable with the wheels of a bicycle when said inward position is defined.

10. Apparatus as set forth in claim 1 in which said second member is pivotally attached to said base.

11. Apparatus as set forth in claim 1 in which said second elements extend generally normal to the second member in general parallelism with said first element.

* * * * *